US010606784B1

(12) United States Patent
Jreij et al.

(10) Patent No.: US 10,606,784 B1
(45) Date of Patent: Mar. 31, 2020

(54) SOFTWARE FILTERING OF REDUNDANT SIDEBAND DEVICE MANAGEMENT BUS COMMUNICATIONS

(71) Applicant: Dell Products, L.P., Round Rock, TX (US)

(72) Inventors: Elie Antoun Jreij, Pflugerville, TX (US); Choudary Maddukuri, Austin, TX (US); Ajeesh Kumar, Bangalore (IN); Kala Sampathkumar, Bangalore (IN); Pablo R. Arias, Austin, TX (US); Rama Rao Bisa, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/170,413

(22) Filed: Oct. 25, 2018

(51) Int. Cl.
    *G06F 13/40* (2006.01)
    *G06F 13/42* (2006.01)
    *H04L 9/30* (2006.01)
    *G06F 13/28* (2006.01)

(52) U.S. Cl.
    CPC .......... *G06F 13/4027* (2013.01); *G06F 13/28* (2013.01); *G06F 13/4282* (2013.01); *H04L 9/30* (2013.01); *G06F 2213/0026* (2013.01); *G06F 2213/0028* (2013.01)

(58) Field of Classification Search
    CPC ... G06F 13/4027; G06F 13/4282; H04L 9/30; H04L 45/22
    USPC ........................................................ 710/314
    See application file for complete search history.

(56) References Cited

U.S. PATENT DOCUMENTS

| | | | | |
|---|---|---|---|---|
| 4,627,045 A * | 12/1986 | Olson | ................... | H04L 12/417 370/225 |
| 5,381,150 A * | 1/1995 | Hawkins | .............. | G01R 23/165 342/13 |
| 5,414,762 A * | 5/1995 | Flisik | ...................... | H04M 3/22 379/198 |
| 5,726,668 A * | 3/1998 | Clement | ............ | G05B 19/4183 340/3.7 |
| 6,212,190 B1 * | 4/2001 | Mulligan | ................ | H04L 29/06 370/400 |
| 7,286,467 B1 * | 10/2007 | Sylvain | ................... | H04L 45/00 370/216 |
| 7,606,886 B1 * | 10/2009 | Bechtolsheim | ..... | H04L 41/0663 709/223 |
| 7,769,928 B1 * | 8/2010 | Tran | ...................... | G06F 13/387 710/61 |

(Continued)

*Primary Examiner* — Paul R. Myers
(74) *Attorney, Agent, or Firm* — Fogarty LLP

(57) ABSTRACT

Sideband device management bus messages are filtered using software operations in order to minimize dropped messages and to maintain the bus in an operable state. Redundant sideband device management buses are utilized in order to provide fail-over transmission of messages in scenarios where one of the buses becomes inoperable. Multi-packet messages are transmitted to managed devices via the sideband bus connections. If an inoperable state is detected in a sideband bus connection during transmission of a multi-packet message, the portion of the multi-packet message not received by the managed device is transmitted via a redundant sideband bus connection with the managed device. Software filtering of bus transactions utilizes a circular DMA buffer for storing all incoming transactions. Transactions of interest are copied to buffers associated with specific endpoints for processing.

16 Claims, 5 Drawing Sheets

(56) References Cited

U.S. PATENT DOCUMENTS

| | | | |
|---|---|---|---|
| 9,652,388 B2* | 5/2017 | Shanbhogue | G06F 12/0808 |
| 10,185,639 B1* | 1/2019 | Chatterjee | G06F 11/2092 |
| 10,218,644 B1* | 2/2019 | Mujica | H04L 49/552 |
| 2003/0063613 A1* | 4/2003 | Carpini | H04L 45/02 370/401 |
| 2005/0201749 A1* | 9/2005 | Wang | H04B 10/032 398/12 |
| 2006/0168147 A1* | 7/2006 | Inoue | A63F 13/12 709/219 |
| 2008/0239945 A1* | 10/2008 | Gregg | G06F 11/2005 370/217 |
| 2009/0010153 A1* | 1/2009 | Filsfils | H04L 45/02 370/218 |
| 2009/0024867 A1* | 1/2009 | Gloege | G06F 11/2007 714/3 |
| 2009/0083760 A1* | 3/2009 | Slaight | G06F 13/4022 719/313 |
| 2012/0236710 A1* | 9/2012 | Tochio | H04L 12/40189 370/228 |
| 2013/0322231 A1* | 12/2013 | Csaszar | H04L 45/16 370/217 |
| 2013/0346666 A1* | 12/2013 | Chang | G06F 13/20 710/313 |
| 2015/0160961 A1* | 6/2015 | Johnson | H04L 63/0272 718/1 |
| 2015/0331473 A1* | 11/2015 | Jreji | G06F 1/3206 713/320 |
| 2016/0057592 A1* | 2/2016 | Tagg | H04W 84/042 455/414.1 |
| 2016/0241464 A1* | 8/2016 | Modena | H04L 45/02 |

* cited by examiner

SOFTWARE FILTERING OF REDUNDANT SIDEBAND DEVICE MANAGEMENT BUS COMMUNICATIONS

FIELD

The present disclosure generally relates to Information Handling Systems (IHSs), and, more particularly, to the management of interfaces and devices that comprise IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS includes buses that are used to communicate signals, such as transmitting data, between the various components that comprise an IHS. Such buses are prone to becoming frozen in an inoperable state due to various types of malfunctions, errors and spurious conditions. Buses may also become inoperable due to an inability to process received bus messages quickly enough to prevent overflow of buffers to which the bus messages are stored upon receipt. When buses used for monitoring and management functions become inoperable, messages transmitted in support of these functions may be dropped and the effectiveness of the monitoring and management functions may be compromised.

SUMMARY

In various embodiments, a method is provided for maintaining communications with a plurality of managed devices of an IHS (Information Handling System) by a remote access controller. The method includes: configuring a sideband management connection with a first managed device via a first bus connection; initiating transmission of a multi-packet message to the first managed device via the first bus connection; detecting an inoperable state in the first bus connection during the transmission of the multi-packet message; determining a portion of the multi-packet message not received by the first managed device prior to the inoperable state of the first bus connection; configuring the sideband management connection via a second bus connection; and transmitting the determined portion of the multi-packet message to the managed device via the second bus connection.

In additional embodiments, the method further includes receiving, via the second bus connection, a MCTP (Management Component Transport Protocol) message from the managed device in response to the multi-packet message. In additional embodiments, the method further includes storing the received response message in a receive FIFO (First In First Out) data structure of the remote access controller. In additional embodiments, the method further includes upon the storage of the received response message in the receive FIFO, transferring, using a DMA (Direct Memory Access) operation, the response message to a circular buffer beginning at a write pointer location. In additional embodiments, the method further includes incrementing the write pointer location to the next location in the circular buffer after the stored response message. In additional embodiments, the method further includes determining an organization of a MCTP response message stored at a read pointer of the circular buffer. In additional embodiments, the method further includes if messages for the determined organization are being processed, copying the MCTP response message from the circular buffer to a buffer designated for messages from the sender of the MCTP response message. In additional embodiments, the method further includes incrementing the read pointer to the address of the next message in the circular buffer.

In various additional embodiments, a remote access controller configured for managing a plurality of devices of an IHS (Information Handling System) includes: one or more processors; and a memory device coupled to the one or more processors, the memory device storing computer-readable instructions that, upon execution by the one or more processors, cause the system to: configure a first sideband management connection with a first managed device via a primary bus connection; transmit a message to the first managed device via the primary bus, wherein the message is encoded using a first symmetric key; configure a second sideband management connection via a secondary bus connection; and transmit the first symmetric key to the managed device via the secondary bus connection, wherein the first symmetric key is utilized to decode the message.

In additional embodiments, the remote access controller further includes a hardware multiplexer for coupling the remote access controller to the first managed device via the secondary bus connection. In additional remote access controller embodiments, the hardware multiplexer establishes a secondary bus connection with the first managed device, wherein the secondary bus connection cannot be monitorable by any of the plurality of managed devices other than the first managed device. In additional remote access controller embodiments, all of the plurality of managed devices can monitor transmissions on the primary bus connection. In additional remote access controller embodiments, the primary bus connection is a PCIe (PCI Express) VDM (Vendor Defined Message) bus connection. In additional remote access controller embodiments, the secondary bus connection is an I2C bus connection.

In various additional embodiments, a system is provided for filtering PCIe VDM MCTP (Management Component Transport Protocol) messages received from a plurality of managed devices. The system includes: the volatile memory of an IHS (Information Handling System), wherein the volatile memory supports DMA (Direct Memory Access) operations, and wherein the volatile memory comprises a circular buffer; a remote access controller configured to manage the plurality of managed devices of an IHS and further configured to: receive PCIe VDM MCTP messages from the plurality of managed devices; store the received PCIe VDM MCTP messages to a receive FIFO (First-In-First-Out) data structure; transfer, using a DMA operation, the PCIe VDM MCTP messages stored in the receive FIFO to the circular buffer, beginning at a write pointer location of the circular buffer; increment the write pointer location to the next location in the circular buffer after the transferred PCIe VDM MCTP messages; and filter the PCIe VDM MCTP message at a read pointer location in the circular buffer based on identification of the PCIe VDM MCTP message as associated with an organization managing the plurality of managed devices.

In additional system embodiments, the remote access controller is further configured to determine the organization of the PCIe VDM MCTP message at the read pointer location based on a vendor identification provided in the PCIe VDM MCTP message. In additional system embodiments, the remote access controller is further configured to copy the filtered PCIe VDM MCTP message from the circular buffer to an endpoint buffer designated for filtered PCIe VDM MCTP messages from the managed device that generated the PCIe VDM MCTP message. In additional system embodiments, the remote access controller is further configured to increment the read pointer location to the address of the next PCIe VDM MCTP message in the circular buffer regardless of whether the PCIe VDM MCTP message is filtered and copied to the endpoint buffer. In additional system embodiments, the PCIe VDM MCTP messages are received via a PCIe VDM bus connection with the plurality of managed devices. In additional system embodiments, the endpoint buffer is a storage location in the volatile memory of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Remote management of IHSs supports the centralized administration of virtualized systems that are configured using the remotely managed IHSs. Remote management of an IHS may be implemented using components such as the remote access controller described herein that monitors various aspects of the operation of the IHS. Such monitoring may be implemented using sideband bus communications between the remote access controller and components of the IHS being managed by the remote access controller. As described, a bus may be rendered inoperable, thus preventing transmission of messages by monitored components of an IHS and consequently preventing effective management of the IHS by the remote access controller. Embodiments described herein describe methods and system for software filtering of redundant, sideband device management bus communications. The redundant sideband device management busses may provide an alternative bus for use when the bus currently in use becomes inoperable. The software filtering of bus communications similarly prevents loss of transmitted messages by avoiding reliance on hardware filtering that can be prone to failure and that may be overwhelmed by high message volumes.

Figure 1:
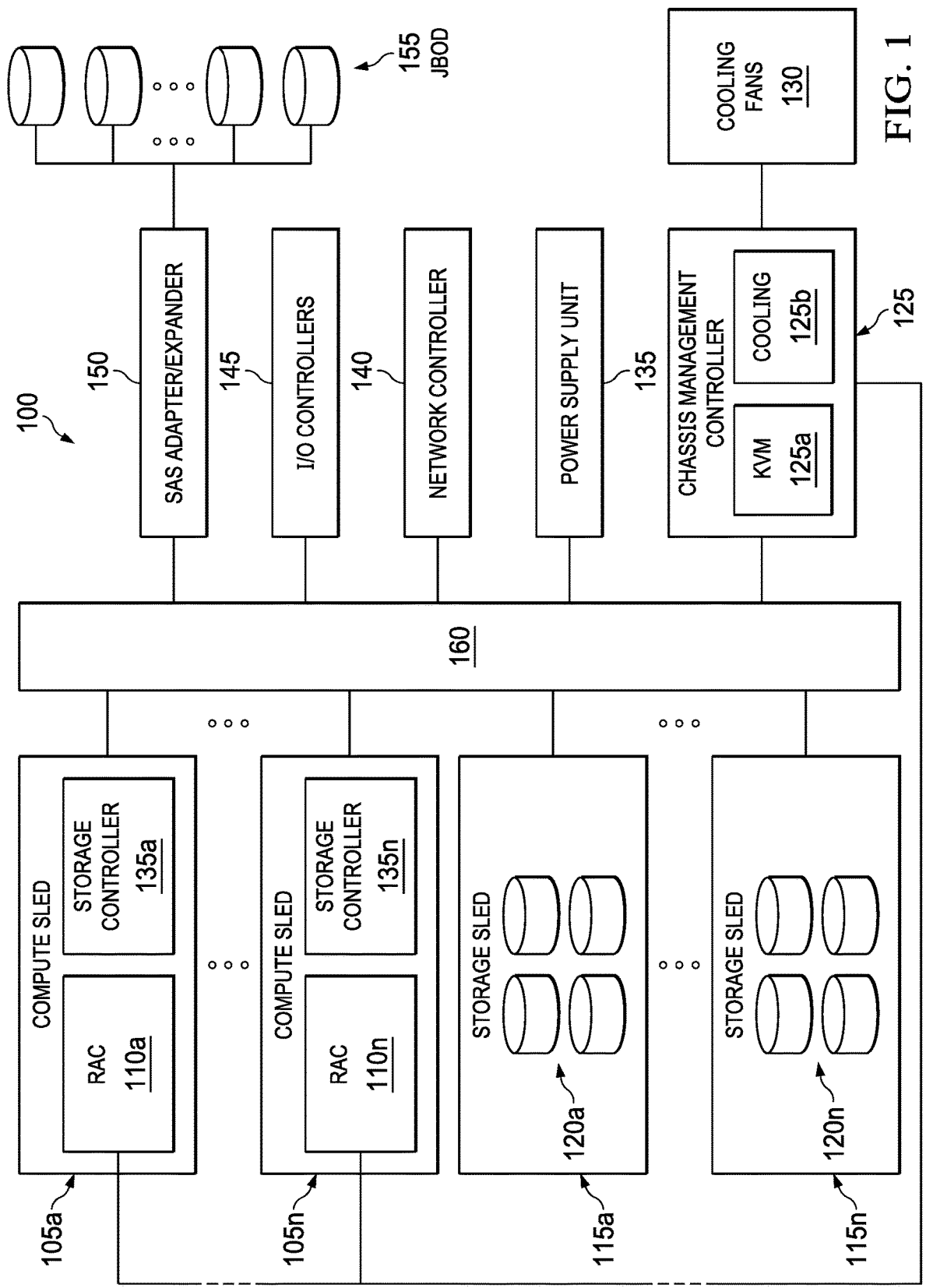
FIG. 1 is a diagram illustrating certain components of a chassis, according to some embodiments that includes a plurality of IHSs configured for software filtering of redundant, sideband device management bus communications.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon.

Such components installed on a motherboard backplane 160 may include components that implement all or part of the functions described with regard to the SAS (Serial Attached SCSI) expander 150, I/O controllers 145, network controller 140 and power supply unit 135.

Figure 2:
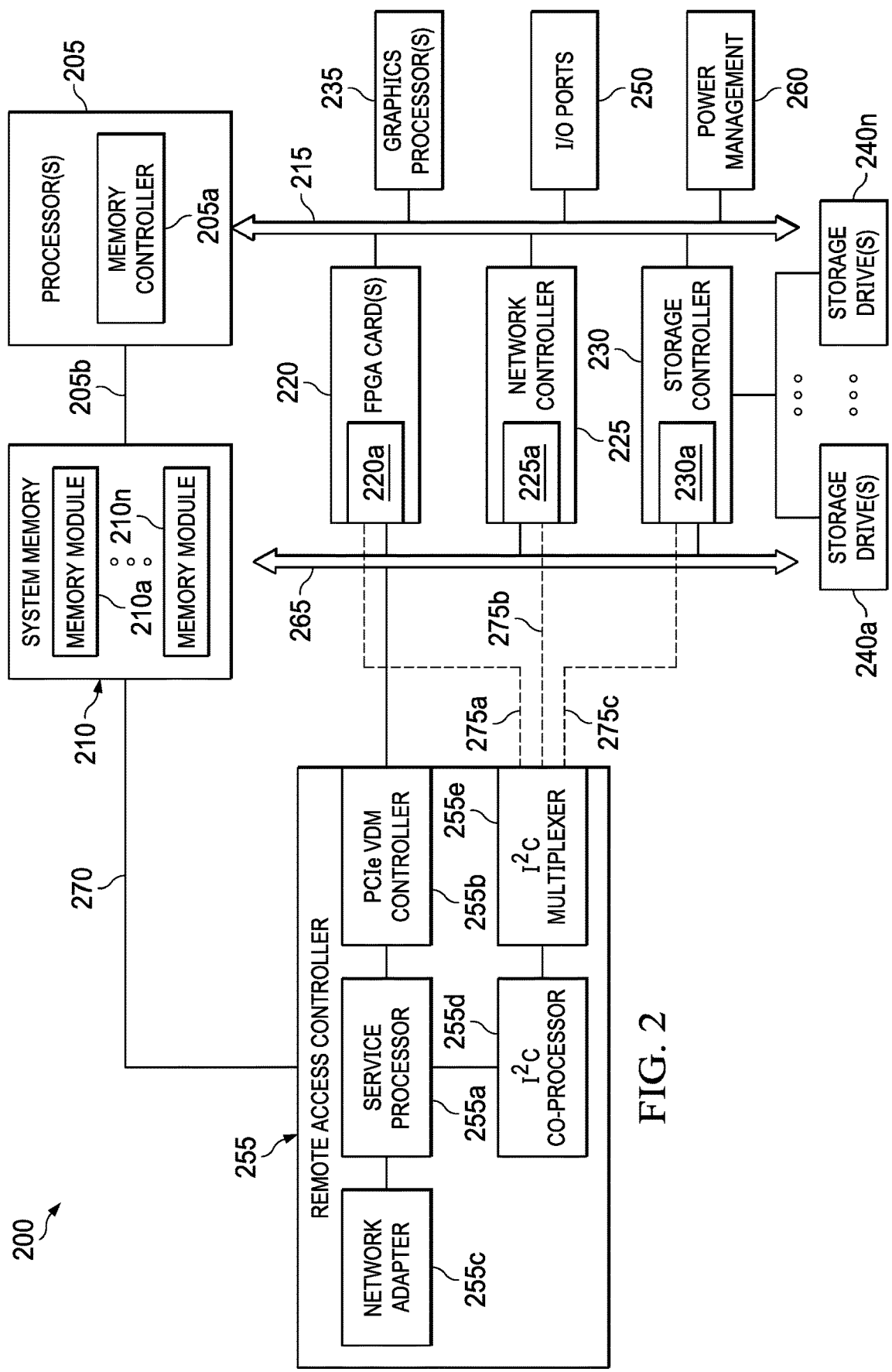
FIG. 2 is a diagram illustrating certain components of an IHS configured, according to some embodiments, for software filtering of redundant, sideband device management bus communications.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controller 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

As illustrated, chassis 200 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also may be remotely located.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface directly with the chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105a-n, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various devices 220, 225, 230 of an IHS via redundant sideband interfaces. In such embodiments, the messages in support of the monitoring and management function may be implemented using MCTP (Management Component Transport Protocol). The MCTP communications may be transmitted either on a sideband PCIe bus 265 via Vendor Defined Messages (VDMs), in which case sideband device management bus 265 may be referred to as a PCIe VDM bus, or via an I2C sideband bus connection 275a-c established with one of the managed devices 220, 225, 230.

In certain embodiments, the service processor 255a may utilize a PCIe VDM controller 255b to manage communications with MCTP-capable managed devices 220, 225, 230 via a PCIe bus 265 (i.e., PCIe root complex). The PCIe VDM controller 255b may implement the MCTP device management communications between the remote access controller 255 and the managed devices 220, 225, 230 of the IHS 200 via the sideband PCIe bus 265. As illustrated, the managed hardware components of the IHS 200, such as FPGA cards 220, network controller 225 and storage controller 230, are coupled to the IHS processor(s) 205 via an in-line bus 215, such as a PCIe root complex, that is separate from the sideband PCIe bus 265 utilized by the PCIe VDM controller 255b. As described in additional detail with regard to FIGS. 4 and 5, PCIe VDM controller 255b may include software filtering capabilities for identifying specific types of PCIe bus 265 transmissions.

In the illustrated embodiment, VDM controller 225b is a separate component from the service processor 255a. In such embodiments, VDM controller 255b may be a microcontroller or integrated circuit that is configured to implement VDM communications via a PCIe bus 265. In some embodiments, the VDM controller 255b may be an integrated component of the service processor 255a, such as a peripheral system-on-chip feature that may be provided by the service processor 255a.

In certain embodiments, the service processor 255a of remote access controller 255 may rely on an I2C co-processor 255d to implement sideband I2C communications between the remote access controller 255 and managed components 220, 225, 230 of the IHS. The I2C co-processor 255d may be a specialized co-processor or micro-controller that is configured to interface via a sideband I2C bus interface with the managed hardware components 220, 225, 230 of IHS. In some embodiments, the I2C co-processor 255d may be an integrated component of the service processor 255a, such as a peripheral system-on-chip feature that may be provided by the service processor 255a. Each I2C bus 275a-c is illustrated as single line in FIG. 2. However, each I2C bus 275a-c may be comprised of a clock line and data line that couple the remote access controller 255 to I2C endpoints 220a, 225a, 230a, which may be referred to as modular field replaceable units (FRUs).

As illustrated, the I2C co-processor 255d may interface with the individual managed devices 220, 225 and 230 via individual sideband I2C buses 275a-c selected through the operation of an I2C multiplexer 255e. In PCIe communications via the PCIe VDM bus 265, transmissions on the bus may be captured and monitored by the various endpoints on the bus, thus allowing malicious PCIe endpoints to spoof the identity of other bus endpoints. Attempts to secure transmissions on the PCIe VDM are complicated by the insecure nature of a PCIe bus.

Via switching operations by the I2C multiplexer 255e, a secure sideband bus connection 275a-c may be established directly between the I2C co-processor 255d and an individual managed device 220, 225 or 230. The direct coupling provided via the I2C multiplexer 225e prevents eavesdropping by managed components. As described in additional detail, the secure nature of the I2C sideband bus couplings 275a-c may be used to provide support for secure transmission over the higher-bandwidth PCIe VDM bus 265.

In providing redundant sideband management capabilities, both PCIe VDM controller 255b and I2C co-processor 255d may each interoperate with corresponding endpoint MCTP controllers 220a, 225a, 230a that implement the MCTP communications of the respective managed devices 220, 225, 230. The endpoint MCTP controllers 220a, 225a, 230a may be implemented as a dedicated microcontroller for communicating sideband MCTP messages with the remote access controller 255, or endpoint MCTP controllers 220a, 225a, 230a may be integrated SoC functions of a processor of the respective managed device endpoints 220, 225, 230. As described in additional detail regard to FIG. 3, each of the endpoint MCTP controllers may be configured to support communications via redundant sideband busses such as the PCIe VDM bus 265 and the I2C bus 275a-c.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
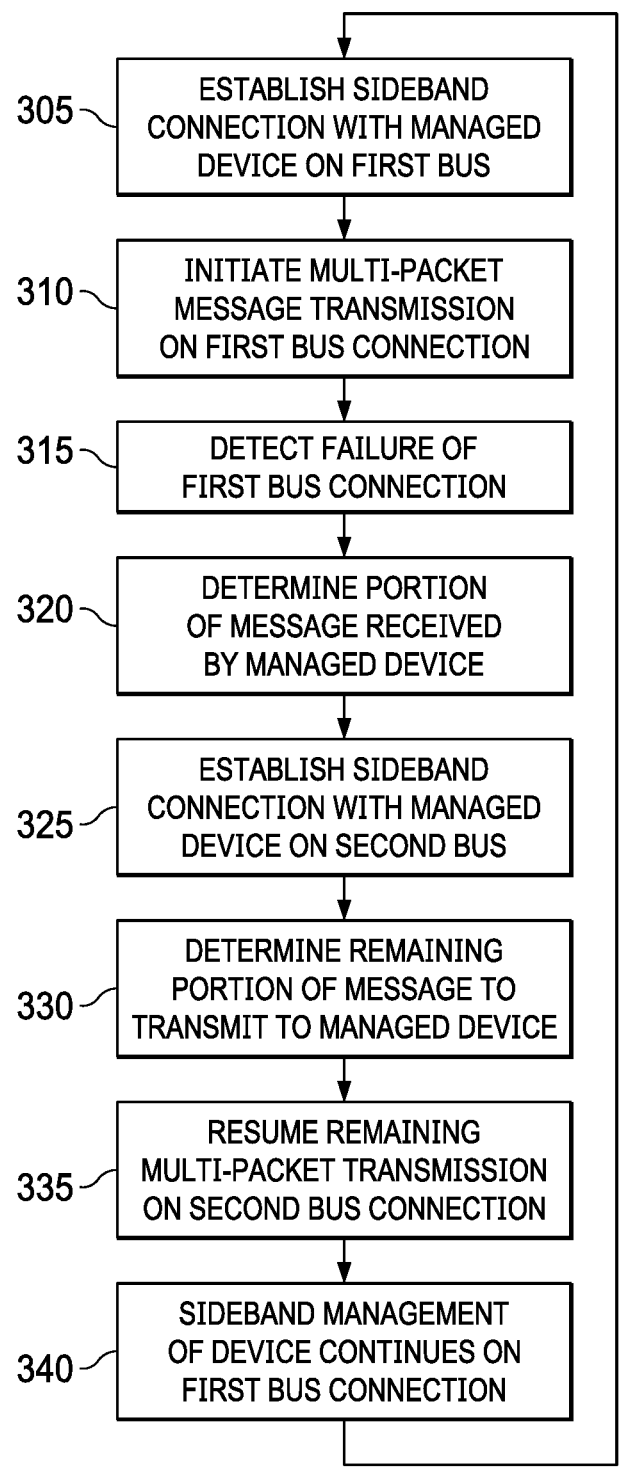
FIG. 3 is a flowchart describing certain steps of a method, according to some embodiments, for redundant, sideband device management bus communications.

FIG. 3 is a flowchart describing certain steps of a method, according to certain embodiments, for redundant, sideband device management bus communications. The illustrated embodiment begins at block 305 with the remote access controller establishing a sideband management connection via a primary bus connection with the managed device. In certain embodiments, the primary sideband bus may be a PCIe VDM bus used to communicate MCTP messages, such as PCIe VDM bus 265 of FIG. 2. In such scenarios, the PCIe VDM controller may be designated as the bus owner of the a PCIe VDM bus and may utilize MCTP endpoint discovery capabilities for identifying the endpoints by which the managed devices are coupled to the primary bus. In establishing a sideband management connection with each of the managed devices, the PCIe VDM controller may also assign each MCTP endpoint a bus address for use on the primary bus.

The PCIe VDM controller may then utilize the primary bus in order to communicate various commands and responses, in the form of VDMs, with the managed device endpoints. Some of these MCTP messages may be transmitted by the PCIe VDM controller using a single VDM packet. In other scenarios, a message may be too large to transmit via a single VDM packet, and may thus be fragmented and transmitted, at step 310, by the endpoint VDM controller as a multiple-packet message. The endpoint VDM controller is configured to reconstruct the message from the multiple VDM packets.

As described, a device management bus may become inoperable for a variety of reasons. During such periods of interoperability, the monitoring and management functions of the remote access controller may be compromised and the operations of the IHS may be impacted. At step 315, the remote access controller determines that the primary bus has become inoperable while in use by the PCIe VDM controller in transmitting a multi-packet transmission to a managed device endpoint.

At step 320, the PCIe VDM controller determines the portion of the multi-packet MCTP message that was received by the managed device endpoint prior to the device management bus becoming inoperable. In some device management protocols, such as communications via a PCIe VDM bus, each transmission of a command is followed by a response from the recipient. In such cases, the portion of the multi-packet transmission that has been received by a managed device endpoint may be determined by tracking responses from the endpoint.

In order to transmit the remaining portion of the multi-packet message to the managed device endpoint, at step 325, the remote access controller may establish another sideband bus connection with the endpoint. As described, such redundant device management bus connections may be established using an I2C connection between and I2C coprocessor and the MCTP controller of the managed device endpoint, with the I2C coprocessor designated as the bus owner of the I2C bus. In some scenarios, the I2C bus may be considered a secondary bus to the primary PCIe VDM bus due to the superior bandwidth and speed provided by PCIe.

At step 330, the remote access controller determines the remaining portion of the MCTP message that was not received by the managed device endpoint due to the inoperable state of the PCIe VDM bus. At step 335, the I2C coprocessor transmits the remaining portion of the MCTP message to the managed device endpoint via the secondary I2C bus connection. Upon confirmation that the complete message has been received, the remote access controller may continue sideband device management operations via the I2C bus connections.

Device management may continue via the I2C bus while the remote access controller attempts to reestablish the PCIe VDM bus connections. In some embodiments, the remote access controller may reinitialize the PCIe VDM controller in order to restart the PCIe VDM bus. Other embodiments may seek to reinitialize the PCIe VDM capabilities of the endpoint MCTP controller. Upon reestablishing the PCIe VDM bus, the remote access controller may switch back device management communications to the PCIe VDM bus.

As described, a PCIe bus may provide greater bandwidth and faster speeds compared to an I2C bus. However, the direct coupling of devices via an I2C bus connection may provide certain security advantages. Accordingly, in some embodiments an I2C bus may be considered a primary bus for certain security-related operations. In such scenarios, the remote access controller may switch transmission of certain security-related management operations to a secondary PCIe VDM bus upon detecting a failure in a primary I2C bus.

As described, the MCTP controller residing on the managed device may be configured to receive commands from the remote access controller via a PCIe VDM bus and/or via an I2C bus. Accordingly, such endpoint MCTP controllers may monitor for MCTP communications on both bus couplings. In scenarios where an MCTP message is transmitted in fragments by the remote access controller due to a bus failure, the endpoint MCTP controller may reconstruct the message from the fragments based on MCTP header information in each of the received packets. In some embodiments, the endpoint MCTP controller may be configured to respond to all MCTP messages via the bus by which the most recent MCTP packet was successfully received. In this manner, the endpoint MCTP controller may switch between the redundant sideband management buses in coordination with the remote access controller in order to complete transmission of an MCTP message. Upon reconstructing the message based on the fragment received via the secondary bus, at block 340, sideband management resumes communication, if possible, via the primary bus connection.

In certain embodiments, the redundant I2C bus may be utilized to support secure transmission of MCTP communications between the remote access controller and managed endpoint devices. As described, PCIe VDM bus communications may be monitored by all bus endpoints, thus allowing rogue endpoint devices to spoof other endpoints. In certain embodiments, the remote access controller may generate a symmetric encryption key for each of the endpoint devices. The remote access controller may then transmit the appropriate symmetric encryption key to an endpoint device via an I2C bus connection with the endpoint device. As described with regard to FIG. 2, an I2C bus connection may be established via a hardware multiplexer that provides a direct connection between a managed endpoint device and the remote access controller, thus supporting secure transmission of the symmetric encryption key. Once received by the endpoint device, the symmetric encryption key may be used to decode VDM payloads received via the PCIe VDM bus, and to encode VDM payloads transmitted via the PCIe VDM bus. In certain embodiments, symmetric encryption keys may be regenerated by the remote access controller on a periodic basis and distributed to the managed endpoint devices.

Utilizing the redundant PCIe VDM bus and I2C bus in this manner, secure high-speed transmissions via the PCIe VDM bus may be supported by transmitting shared secrets via the slower, but more secure I2C bus. In certain embodiments, the PCIe VDM bus may be the preferred primary bus for transmission of large messages, such as transmission of logs and firmware updates, between the remote access controller and the managed endpoint devices. Upon completing the transmission of a large message via the high-speed PCIe VDM bus, the remote access controller may revert to the pre-existing transmission priority between the redundant sideband buses.

Figure 4:
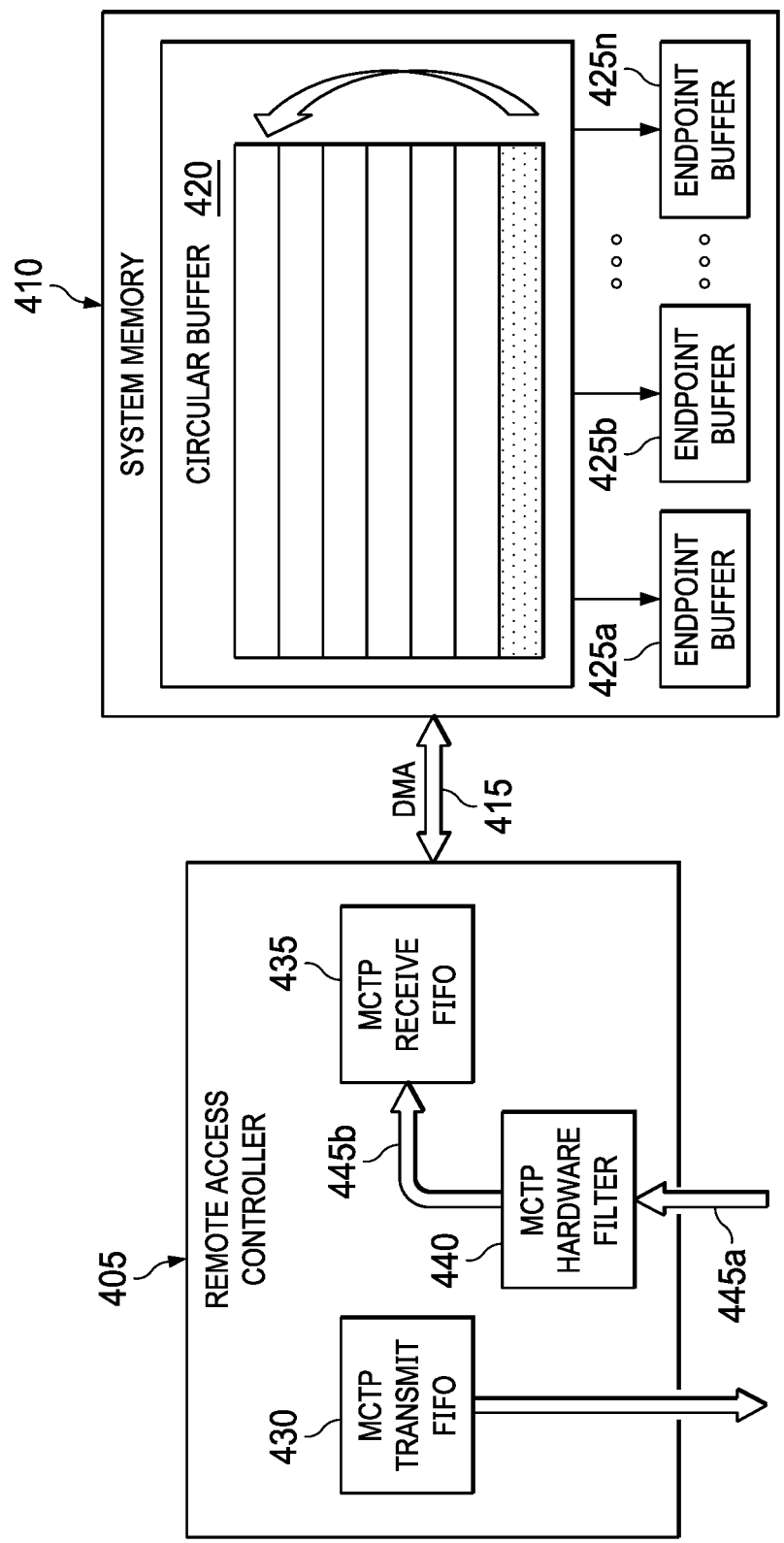
FIG. 4 is a diagram illustrating certain components of a system, within an IHS, configured, according to some embodiments, for software filtering of sideband device management bus communications.

FIG. 4 is a diagram illustrating certain components of a system, within an IHS such as IHS 200 described with regard to FIG. 2, that is configured according to some embodiments, for software implemented filtering of sideband device management bus communications, such as PCIE VDM MCTP messages. The embodiment of FIG. 4 includes a remote access controller, such as described with regard to the prior embodiments, that is configured for remote management of devices of an IHS via sideband bus connections with the managed devices. For instance, the remote access controller may transmit MCTP commands to managed endpoints in the form of VDMs transmitted via a PCIe VDM bus.

In certain scenarios, various additional devices may utilize the redundant sideband buses in addition to the remote access controller's use of the redundant buses in communicating with the managed endpoints. In such scenarios, the remote access controller may identify bus messages transmitted by specific managed endpoints based on an organization identification code included within messages transmitted by these managed endpoints. For instance, the PCIE VDM MCTP messages may support a hexadecimal field by which different organizations may include a unique value for identification of messages associated with particular device management systems.

In certain scenarios, large volumes of MCTP messages may be transmitted via a PCIe VDM bus. In such scenarios, the remote access controller must determine which of these MCTP messages are transmitted by managed endpoint devices of interest. Certain remote access controllers may include a hardware filter 440 by which incoming MCTP messages received 445a via the PCIe VDM bus may be screened in order to identify those with particular organization identification codes of interest to the remote access controller. The screened messages may then be forwarded 445 to a MCTP FIFO 435 for processing. Such hardware filters 440 may be unable to process and filter PCIe VDM bus communications quickly enough in scenarios where large volumes of MCTP messages are being transmitted on the PCIe VDM bus.

Figure 5:
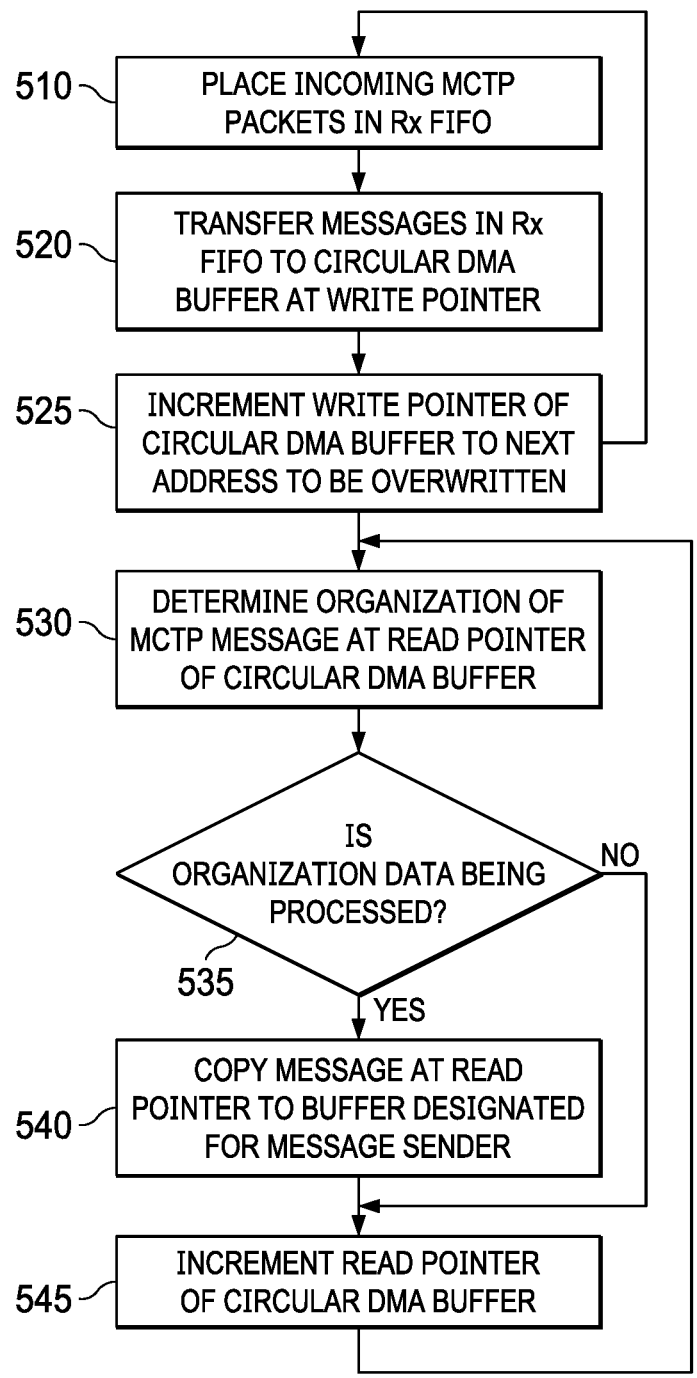
FIG. 5 is a flowchart describing certain steps of a method, according to some embodiments, for software filtering of sideband device management bus communications.

FIG. 5 is a flowchart describing certain steps of a method, according to some embodiments, for software filtering of sideband device management bus communications. The method may begin at, block 510, with incoming PCIE VDM MCTP messages 445a-b stored directly to the MCTP receive FIFO 435. In such scenarios where the hardware filter 440 is malfunctioning, or has otherwise been disabled, the hardware filter 440 may be configured to operate as a pass through that receives incoming PCIE VDM MCTP message 445a and forwards 445b the messages to the MCTP receive FIFO 435.

At step 520, all or a portion of the messages in the MCTP receive FIFO 435 may be transferred via a DMA (Direct Memory Access) operation 415 to a circular buffer 420 that may be maintained in a volatile memory 410, such as the system memory 210 of the IHS 200 in which the remote access controller 255 is installed. In certain embodiments, the messages stored in the MCTP receive FIFO 435 may transferred to the circular buffer 420 in response to every packet received by the receive FIFO 435. The order in which is messages are transferred from the MCTP receive FIFO 435 to the circular buffer 420 may be according to the first in, first out configuration of the receive FIFO 435.

The circular buffer 420 may utilize a write pointer to specify an address within the buffer at which to begin the DMA transfer 415 of message from the MCTP receive FIFO 435. Upon a DMA transfer 415 of messages from the MCTP receive FIFO 435, at step 525, the write pointer of the circular buffer 420 is updated to the next location in the circular buffer following the transferred PCIE VDM MCTP messages. Accordingly, the next DMA transfer 415 of messages from the MCTP receive FIFO 435 will begin at this updated write pointer location in the circular buffer 420.

As described, PCIE VDM MCTP messages may be associated with an organization via a designated field support by PCIE VDM MCTP messages. At step 530, the remote access controller 405 utilizes a DMA operation 415 in order to access the PCIE VDM MCTP message stored at a read pointer address of circular buffer 420. The organization associated with the PCIE VDM MCTP message at the read pointer location is determined, at step 535, and a determination is made regarding whether messages associated with the organization are being processed by the remote access controller. For instance, an organization providing administrative and monitoring functions via the remote access controller 405 may limit processing of PCIE VDM MCTP messages to those that include the unique identifier associated with the organization.

If the organization associated with the message at the read pointer is not being processed, at step 545, the read pointer is incremented to the location of the next message in the circular buffer 420. The remote access controller 405 may continue evaluation of the messages in the circular buffer 420 by determining, at step 530, an organization associated with the PCIE VDM MCTP message located at the incremented read pointer location of the circular buffer 420. Since the organization of the message at the read pointer is not of interest to the remote access controller 405, the message will be overwritten by a subsequent transfer of received PCIE VDM MCTP messages to the write pointer location of the circular buffer 420.

If, at step 535, the organization of the message at the read pointer location is being processed by the remote access controller 405, the message is copied to an endpoint buffer 425a-n in system memory 410 that is dedicated to storing messages received from a particular monitored endpoint. For instance, in the embodiment of FIG. 2, an individual endpoint buffer 425a-n may be maintained in system memory 210 for each of the managed endpoint devices 220, 225, 230. After copying messages of interest to the appropriate endpoint buffer 425a-n, at step 545, the read pointer of the circular buffer is incremented. At step 530, the remote access controller continues evaluation of received messages at the incremented read pointer location of the circular buffer.

In this manner, PCIE VDM MCTP messages may be received by a remote access controller and quickly transferred to system memory via a high-speed DMA operation that is independent of the processor of the IHS, and thus not susceptible to delays in processing received PCIE VDM MCTP messages that may otherwise result in some messages being dropped. Furthermore, the remote access controller may utilize an ongoing process for evaluation of PCIE VDM MCTP messages stored at the read pointer location of the circular buffer. The remote access controller may quickly filter messages in the circular buffer and redirect messages of interest for further processing to dedicated endpoint buffers for each respective managed device.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for filtering communications received from a plurality of managed devices of an IHS (Information Handling System) by a remote access controller, the method comprising:
configuring a sideband management connection with each of the plurality of managed devices via a first bus connection;
receiving, via the first bus connection, PCIe (PCI Express) VDM (Vendor Defined Message) MCTP (Management Component Transport Protocol) messages from the plurality of managed devices;
storing the MCTP messages to a circular buffer beginning at a write pointer location; and
filtering a first MCTP message at a read pointer location of the circular buffer based on an identification of an organization associated with the managed device associated with the first MCTP message.

2. The method of claim 1, further comprising:
incrementing the write pointer location to the next location in the circular buffer after the stored MCTP messages.

3. The method of claim 1, further comprising:
if messages for the organization associated with the managed device are being processed, copying the PCIe VDM MCTP response message from the circular buffer to a buffer designated for messages from the managed device.

4. The method of claim 3, further comprising:
incrementing the read pointer to the address of the next message in the circular buffer.

5. A remote access controller configured for managing a plurality of devices of an IHS (Information Handling System), the remote access controller comprising:
one or more processors; and
a memory device coupled to the one or more processors, the memory device storing computer-readable instructions that, upon execution by the one or more processors, cause the system to:
configure a first sideband management connection with a first managed device via a primary bus connection;
transmit a message to the first managed device via the primary bus, wherein the message is encoded using a first symmetric key;
configure a second sideband management connection via a secondary bus connection; and
transmit the first symmetric key to the managed device via the secondary bus connection, wherein the first symmetric key is utilized to decode the message.

6. The remote access controller of claim 5, further comprising:
a hardware multiplexer for coupling the remote access controller to the first managed device via the secondary bus connection.

7. The remote access controller of claim 6, wherein the hardware multiplexer establishes a secondary bus connection with the first managed device, wherein the secondary bus connection cannot be monitorable by any of the plurality of managed devices other than the first managed device.

8. The remote access controller of claim 7, wherein all of the plurality of managed devices can monitor transmissions on the primary bus connection.

9. The remote access controller of claim 8, wherein the primary bus connection is a PCIe (PCI Express) VDM (Vendor Defined Message) bus connection.

10. The remote access controller of claim 9, wherein the secondary bus connection is an I2C bus connection.

11. A system for filtering PCIe (PCI Express) VDM (Vendor Defined Message) MCTP (Management Component Transport Protocol) messages received from a plurality of managed devices, the system comprising:
the volatile memory of an IHS (Information Handling System), wherein the volatile memory supports DMA (Direct Memory Access) operations, and wherein the volatile memory comprises a circular buffer;
a remote access controller configured to manage the plurality of managed devices of an IHS and further configured to:
receive PCIe VDM MCTP messages from the plurality of managed devices;
store the received PCIe VDM MCTP messages to a receive FIFO (First-In-First-Out) data structure;
transfer, using a DMA operation, the PCIe VDM MCTP messages stored in the receive FIFO to the circular buffer, beginning at a write pointer location of the circular buffer;
increment the write pointer location to the next location in the circular buffer after the transferred PCIe VDM MCTP messages; and
filter the PCIe VDM MCTP message at a read pointer location in the circular buffer based on identification of the PCIe VDM MCTP message as associated with an organization managing the plurality of managed devices.

12. The system of claim 11, wherein the remote access controller is further configured to determine the organization of the PCIe VDM MCTP message at the read pointer location based on a vendor identification provided in the PCIe VDM MCTP message.

13. The system of claim 11, wherein the remote access controller is further configured to copy the filtered PCIe VDM MCTP message from the circular buffer to an endpoint buffer designated for filtered PCIe VDM MCTP messages from the managed device that generated the PCIe VDM MCTP message.

14. The system of claim 13, wherein the remote access controller is further configured to increment the read pointer location to the address of the next PCIe VDM MCTP message in the circular buffer regardless of whether the MCTP message is filtered and copied to the endpoint buffer.

15. The system of claim 11, wherein the MCTP messages are received via a PCIe VDM bus connection with the plurality of managed devices.

16. The system of claim 11, wherein the endpoint buffer is a storage location in the volatile memory of the IHS.

* * * * *